(12) United States Patent
Underwood et al.

(10) Patent No.: US 6,947,906 B1
(45) Date of Patent: Sep. 20, 2005

(54) METHOD FOR CONDUCTING A COMPUTERIZED GOVERNMENT AUCTION

(75) Inventors: Michael Underwood, Montgomery, AL (US); Forrest Simonton, Austin, TX (US)

(73) Assignee: GovDeals.com, Inc., Montgomery, AL (US)

( * ) Notice: Subject to any disclaimer, the term of this patent is extended or adjusted under 35 U.S.C. 154(b) by 840 days.

(21) Appl. No.: 09/580,145

(22) Filed: May 30, 2000

(51) Int. Cl.[7] .............................................. G06F 17/60
(52) U.S. Cl. ......................... 705/37; 705/35; 705/39; 705/26; 705/27
(58) Field of Search .................................... 705/14–40

(56) References Cited

U.S. PATENT DOCUMENTS

| | | | | |
|---|---|---|---|---|
| 5,890,138 | A | * | 3/1999 | Godin et al. ................... 705/26 |
| 5,924,082 | A | * | 7/1999 | Silverman et al. ............. 705/37 |
| 6,058,379 | A | * | 5/2000 | Odom et al. ................... 705/37 |
| 6,484,158 | B1 | * | 11/2002 | Johnson et al. ................ 707/2 |

FOREIGN PATENT DOCUMENTS

WO    WO 00/50970    *   8/2000   ........... G06F 17/60

OTHER PUBLICATIONS

Dennis L. Prince "Auction this! Your Complete Guide to the World of Online Auctions" Prima Publishing, 1999, p. 64.*

* cited by examiner

Primary Examiner—Hani Kazimi
Assistant Examiner—Narayanswamy Subramanian
(74) Attorney, Agent, or Firm—Olson & Hierl, Ltd.

(57) ABSTRACT

The invention provides a method for conducting a computerized auction of government-held property that is subject to a tiered restriction process. The sale or transfer of a government-held asset can be restricted as to the community a potential buyer must be a member of and specific attributes of the buyer. The buyer is only allowed to bid on those assets for which his organizational community and attributes match those specified by the seller. Government agency sellers set up and define their own asset profile codes comprising community groups, which permits the seller to restrict the sale of a particular asset to as large or small a community as the seller desires and enables the government agency to accommodate any regulations or procedures that might be in place for a particular asset.

5 Claims, 5 Drawing Sheets

METHOD FOR CONDUCTING A COMPUTERIZED GOVERNMENT AUCTION

FIELD OF THE INVENTION

The present invention relates generally to a method for conducting a computerized auction, and in particular to a method for conducting an on-line auction of assets by government agencies over the Internet that allows for a tiered restriction process wherein the sale or transfer of an asset can be restricted to particular buyers that possess certain qualifications.

BACKGROUND OF THE INVENTION

Auctions provide a popular and exciting marketplace for the buying and selling of property. Recently, computerized auctions that take place over the Internet have become very popular. Such Internet auctions often include the sale of items ranging from sporting event tickets to fine art to stuffed animals.

Such computerized and Internet auctions typically include the maintenance of a computer server or servers that maintains a database of product information, maintains an identification of different products to be auctioned, is capable of promoting the products and the designated time of the auction prior to the auction to increase awareness of the product, conduct the auction itself, arrange for payment of the products by the buyer, and arrange for transfer of the products by the seller. Examples of such consumer auctions are available from several companies on the Internet, such as Ebay, Yahoo, and Bid.com.

Despite the proliferation of consumer auctions that are available to the general population for common consumer products, a different type of auction that requires a different method of conduct involves the sale or transfer of property by government agencies. Unlike the typical consumer auction, the transfer of property by government agencies through an auction often involves several considerations that, to date, have not been adequately addressed by the computerized auctions in place. Further, the current method of conducting auctions of property by government agencies fails to address numerous problems, which are discussed below, and has resulted in inefficiencies that prevent the government agencies from obtaining the optimal price for its property and has increased the expense associated with the asset disposition process.

Government agencies often possess or acquire several types or categories of property that must be sold or otherwise disposed of. Such property is typically segregated into four types of property called excess property, surplus property, unclaimed property, and confiscated property. Depending on the particular asset to be sold, government regulations and procedures often dictate that government agencies must follow certain guidelines, which generally include a hierarchy of persons or organizations that are eligible to purchase the asset. For example, pursuant to government restrictions, the agencies may be required to make certain assets available to particular communities, such as other specific government organizations, before the general public is allowed to bid on the property. In other words, the property is offered in a sequential manner that provides preferred access to the asset to specified organizational communities such as other government agencies, and non-profit organizations. In addition to the community restrictions, these guidelines may also include asset restrictions, which may limit access to a particular asset to people with certain licenses or permits. For example, if a government agency wishes to dispose of surplus dynamite, only those with permits to handle explosives will be allowed to bid on the property.

Large governments must dispose of thousands of items worth hundreds of millions of dollars each year by way of auctions. The following is a brief explanation of the different types of government property that would typically be auctioned according to the method of the present invention. One type of property that was mentioned above is excess property. This includes property that is excess to an agency's needs, but which may have value to other government agencies or non-profit organizations. Another type of property is called surplus property, which is excess property that is not transferred to another government agency or non-profit organization. In addition to the disposition of excess and surplus property, governments must be able to dispose of property which has come into their possession from private individuals and organizations. This type of property generally comes in two forms: (1) unclaimed property from deceased individuals who left estates with no wills and no heirs, and (2) property confiscated from individuals and organizations as a consequence of their performing illegal activities. Each of these types of property must be disposed of according to the government agency restrictions.

Previously, no method for efficiently profiling or screening potential purchasers to make certain they satisfy the restrictions designated by the sellers has been available in computerized auctions. The present invention provides a method for greatly enhancing the efficiency of profiling or screening potential purchasers and for performing government auctions, thereby enabling the greatest number of qualified buyers access to and information about property to be sold by government agencies.

The existing government processes for checking that potential buyers satisfy each agency's restrictions, and for disposing of such excess, surplus, unclaimed, and confiscated property has been manual and paper intensive. Such a manual and paper intensive process is highly inefficient and results in several problems. Under the present method of disposing of assets by government agencies there is a very limited dissemination of information on available property. Therefore, auctions for assets held by government agencies are often sparsely attended by potential buyers. Government auctions to such a limited number of purchasers usually results in the property being sold for a much lower price than could be obtained if the auction was attended by a greater number of interested buyers. In order to ensure that the government obtains the best possible price within the structure of the regulations, property must be made available for public auction to the widest possible number of authorized buyers. It is also important that the property be disposed of in a timely manner and for the best possible value in order to minimize inventory carrying costs and maximize revenues.

One hurdle facing the efficient disposition of assets held by government agencies is matching eligible buyers with particular assets when they become available. With the auctions for government-held property that were previously conducted, there was no automatic dissemination of information about available property to all or even a majority of potentially interested bidders. Further, there did not exist an automatic means for determining which buyers were eligible to participate in an auction for a particular asset. Moreover, the time required for processing the information for the potential bidders to determine whether the buyer satisfies the government restrictions can be lengthy and create a great deal of undue uncertainty for both buyer and seller. The manual processing of the required information causes further delays in disposing of the property and thereby increases the inventory and storage costs.

The current auction methodology for government-held property also creates many inefficiencies for potential buyers. For instance, sellers are not provided an easy means to notify potential buyers when items of particular interest are made available for auction. Another problem with the current method is that in order to participate, interested buyers typically need to physically attend the various auctions. This may cause problems and lost opportunities due to the geographical location of the auction relative to the potential buyer. In situations where a buyer need not be present, the buyer is generally not provided with photographs of the property, and is therefore limited in his or her inspection of the property. Potential bidders must also submit their personal information on numerous occasions to several separate government agencies, thereby creating unnecessary duplicative efforts as well as increasing the opportunities for error. Moreover, because the various governments conduct auctions in non-standardized manners, potential buyers may believe that they are ineligible to participate in one auction because of the restrictions of a different governmental entity. Therefore, potential buyers may miss out on opportunities to which they may have held an interest and for which they were eligible because of this mistaken belief.

Under the current method of conducting government auctions, it is often the case that the auctions are attended by only a handful of people or organizations, as opposed to the much larger pool of authorized and interested buyers. This inability to efficiently process and disseminate information about the auctions results in a substantial loss of revenue to the government agency.

SUMMARY OF THE INVENTION

The present invention is designed to overcome the shortcomings of the current method for conducting governments auctions by providing a computer based government auction method that efficiently profiles potential buyers and screens the buyer's profiles against the restrictions for a particular asset to determine who are authorized buyers. Pursuant to the method of the present invention, a provider company provides a computerized auction that takes into consideration the tiered restriction policies of the government agencies. As discussed below, the method of the present invention affords sellers the flexibility to indicate any profile code desired for any particular asset. The present invention also minimizes the processing burden of the government agency and maximizes potential revenue by using computerized auction capabilities.

The method of the present invention provides a computerized auction of assets held by a government agency that can be restricted as to the community a potential buyer must be a member of and specific attributes of the buyer. The buyer is only allowed to bid on those assets for which his organizational community and attributes match those specified by the seller.

In addition to the general organizational communities that are part of the present invention, sellers can set up and define their own community groups. This permits the government agencies to restrict the sale of a particular asset to as large or small a community as they desire. Using the method of the present invention makes it possible to efficiently accommodate any regulations or procedures that might be in place concerning the sale or distribution of government-held assets.

A key to the multi-level restrictive auctions of the present invention is matching the restriction definitions stipulated for a particular asset by the seller with buyers having profiles that qualify them to bid on the asset. When a buyer registers with the provider company, a buyer profile code is established that captures the community to which the buyer belongs and specific attributes that are significant to the restrictive buying process.

In addition to the community restriction and asset restriction process, the present invention also enables staged auction processing. As stated, local regulations and procedures often dictate that some organizations make assets available to other organizations in a sequential manner that provides preferred access to the asset to specified organizational communities. The present invention accommodates this requirement by facilitating the "staging" of an asset and moving it from one stage to the next based upon user-supplied parameters.

Each stage of a staged auction can be tailored to the needs of the seller. With the exception of basic identification data, the seller can specify a different set of information for each stage. For example, an asset might be restricted to governmental agencies during its first stage and open for bidding by the general public if it is not bought by a governmental agency, and moves to the next stage. There is no limitation to the number of stages that can be set up by the seller.

An asset will move from one stage to the next based upon the seller's input, the asset's status, and period of time. For example the seller may designate a start and stop date/time for each auction stage. If these dates pass before the asset is sold or removed from auction, the next stage is automatically started and the availability of the asset to other buyers is adjusted accordingly.

DETAILED DESCRIPTION OF THE INVENTION

Figure 1:
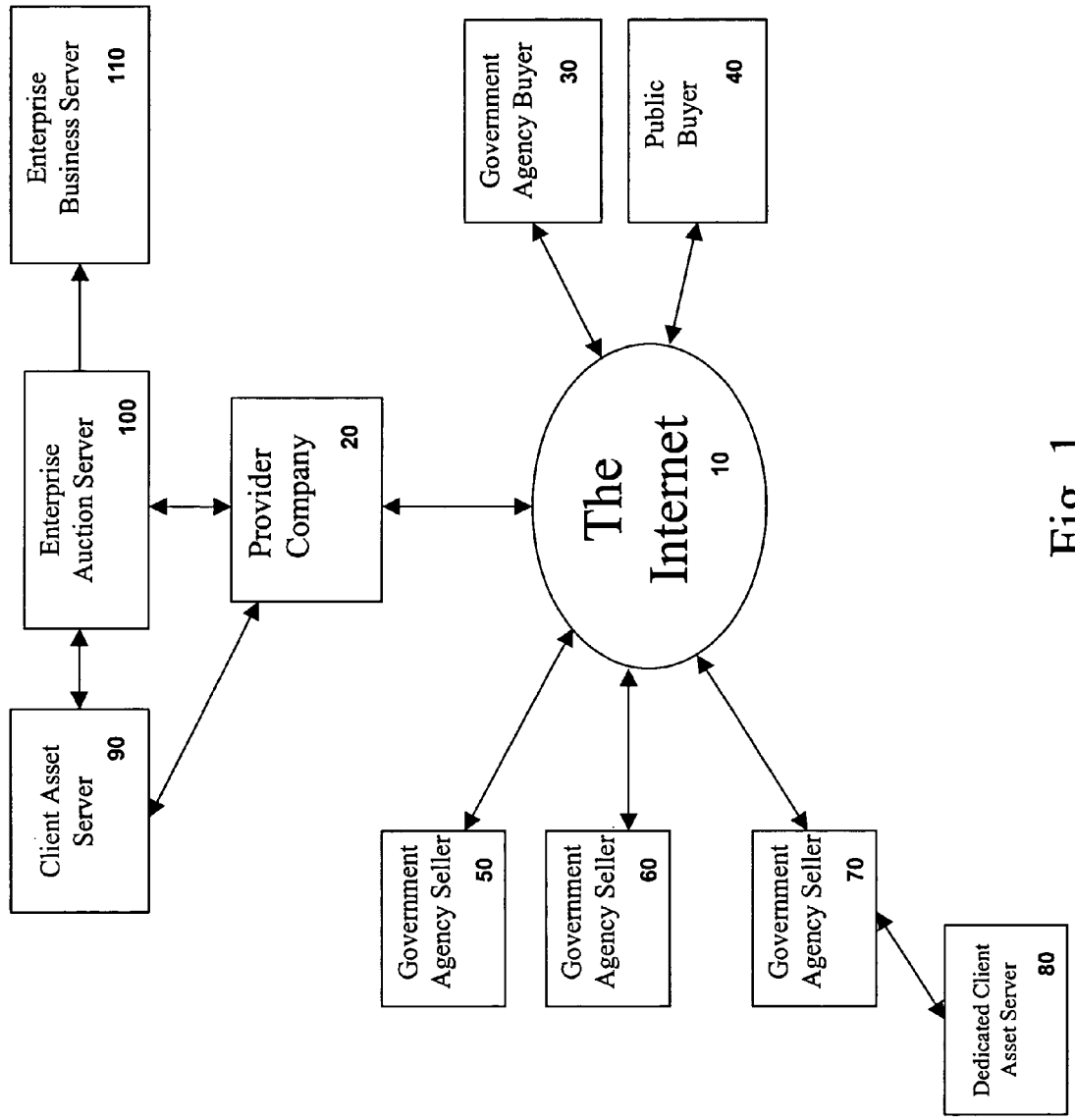
FIG. 1 is an overview of the auction method.

As shown in FIG. 1, in the preferred embodiment, the method of the present invention takes place over computers communicatively linked by the Internet 10; however any linked computer system may be utilized. Various buyers, including government agencies 30 and the general public 40 are connected to the provider company's servers. Various government agency sellers 50, 60, and 70 are also connected to the provider company's servers. In a preferred embodiment, any particular government agency seller 70 that needs to dispose of a large number of assets may have a dedicated Client Asset Server ("CAS") 80.

Figure 2:
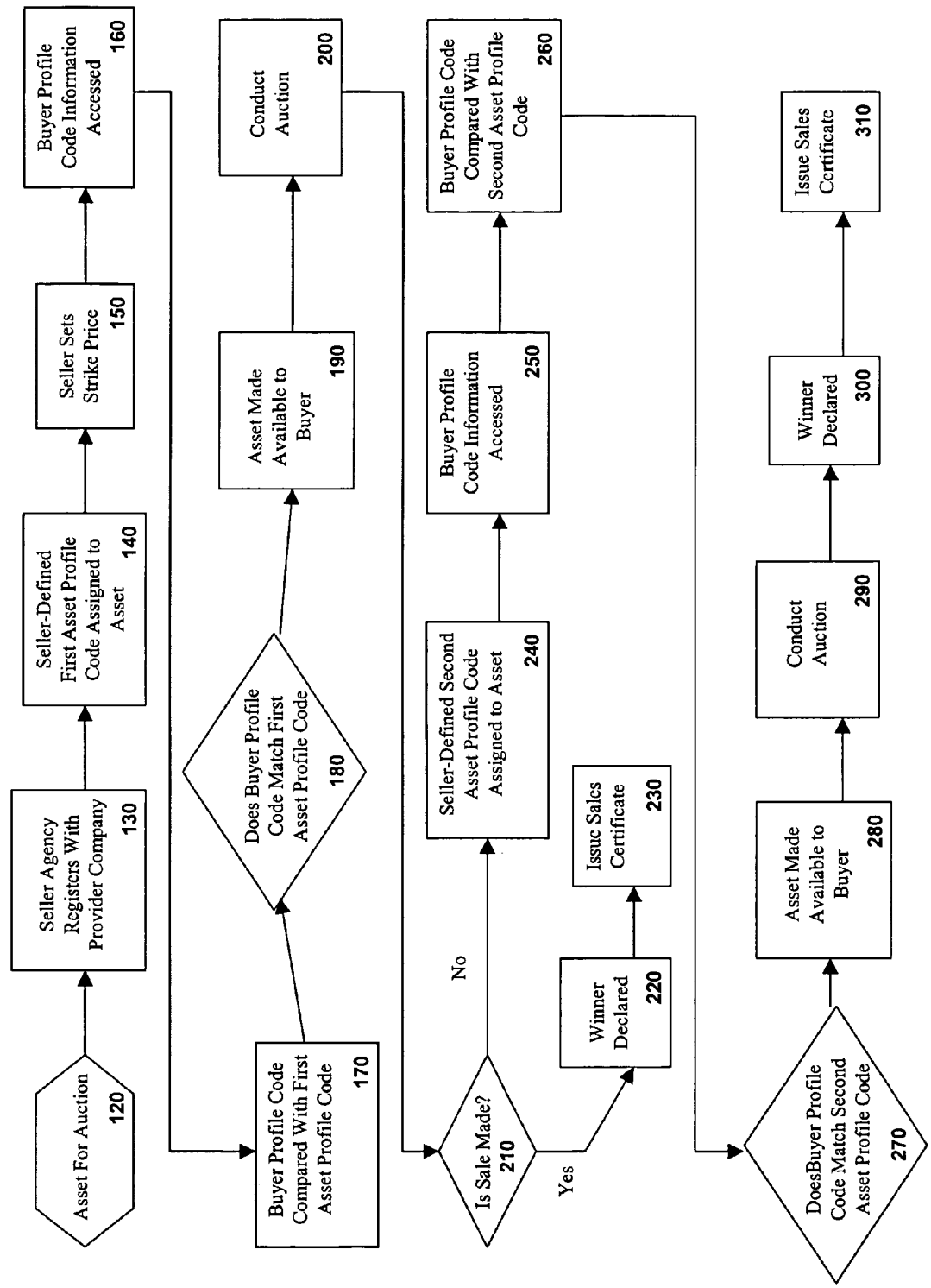
FIG. 2 represents a flowchart of a preferred embodiment of the method of the present invention.
Figure 3:
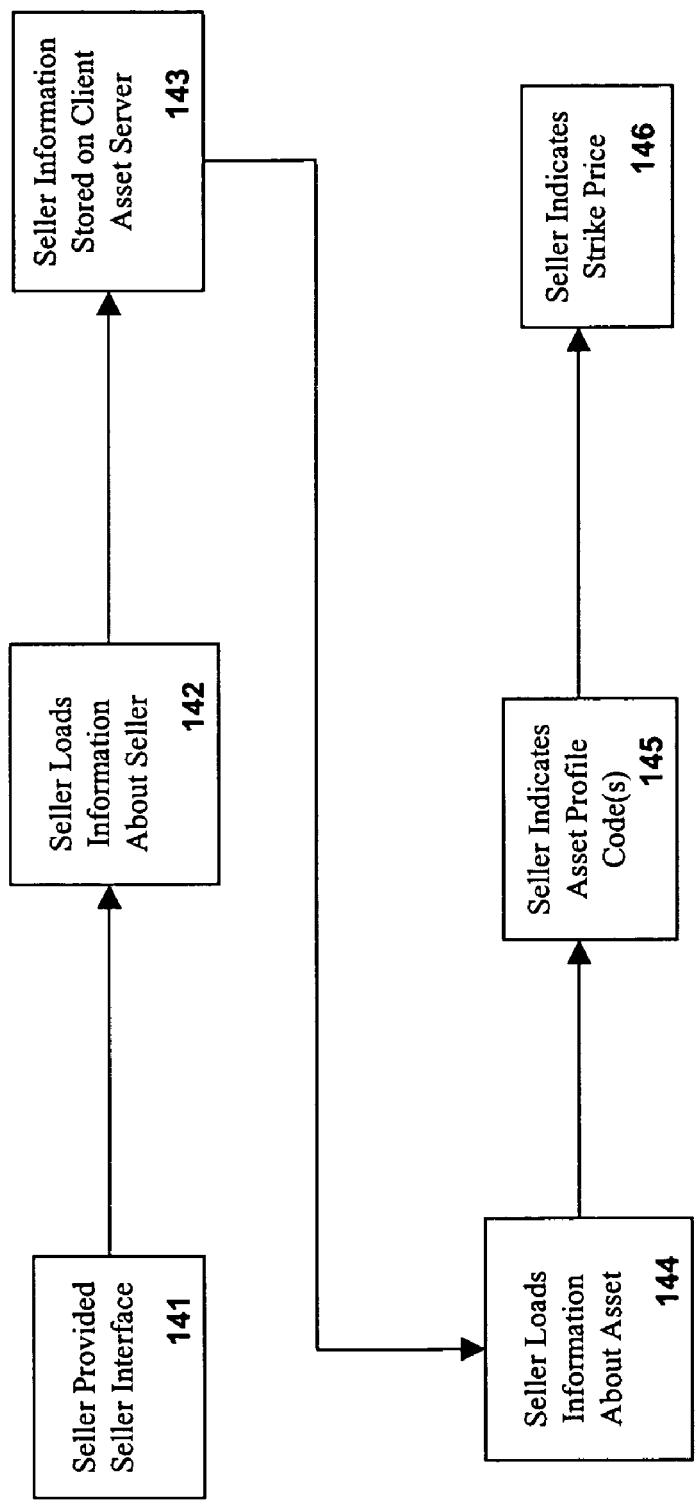
FIG. 3 represents a flowchart of a preferred embodiment of a seller providing asset profile code information.

As shown in FIG. 2, the method of the present invention comprises a tiered restriction process for disposing of an asset for auction 120 comprising several steps including the step wherein the seller indicates an asset profile code 140 that serves to restrict what buyers are eligible to purchase the government asset. The other key feature discussed below is the matching process 180 that evaluates stored buyer profile information, and matches the asset profile code with buyers having profile codes that qualify them to bid on the particular asset.

In the particular embodiment shown in FIG. 2, there is shown an asset for auction 120. A seller must be registered with the provider company to use the method of the present invention, thus if not already registered, the seller agency must do so 130. The seller must then define a first asset profile code for the asset 140. The asset profile code will be described in greater detail below. In this particular embodiment, the seller also indicates a strike price 150 for the asset. After the aforementioned asset information is received by the provider company, buyer profile code information that is maintained by the provider company is accessed 160 and compared with the first asset profile code 170. If the buyer profile code matches the first asset profile code then the asset is made available to the buyer 180, 190, and the auction is conducted 200. If a sale is made then a winner is declared 220 and a sales or award certificate is issued 230. If no sale is made, then, in this embodiment, a seller-defined second asset profile code is assigned to the asset 240. Again, buyer profile code information that is maintained by the provider company is accessed 250 and compared with the second asset profile code 260. If the buyer profile code matches the second asset profile code then the asset is made available to the buyer 270, 280, and the auction is conducted 290. In this embodiment, it is shown that a winner is declared 300 and a sales or award certificate is issued 310.

By evaluating the asset profile code and buyer profile codes, the method of the present invention restricts which buyers are eligible to view and purchase the government asset. For instance, only those buyers that are eligible to purchase the asset are informed of the asset's availability. The asset profile code comprises asset restrictions, which include particular attributes that a buyer must possess, as well as community restrictions, which include specific organizational communities to which the buyer must belong before the buyer is allowed to bid on the asset. For example, the sale can be restricted to buyers who work for a particular public-sector organization and are licensed demolition experts. In addition to general organizational communities that are part of the present invention, sellers can set up and define their own community groups. This permits sellers to restrict the disposition of a particular asset to as large or small a community as they desire. This also makes it possible to accommodate any regulations or procedures that might be in place concerning the restricted sale or distribution of assets.

As shown in the figures provided, a government agency that seeks to dispose of property will register or subscribe with a provider company 130. This government agency, which may be referred to as a seller or subscriber, is provided a seller interface 141 that connects to a CAS wherein the selling agency loads information about itself using a standard interface format 142. The CAS 90 is where the seller's profile information, security information, and information related to the available assets are stored and maintained 143. Once a seller is registered it may then offer assets for sale. To do so, the seller must first provide certain information about the asset such as a description of the property 144. The seller must further provide an asset profile code 145, which as discussed above, includes community restrictions and asset restrictions. The asset profile code can be created by the seller. Alternatively, the government agency may choose from a previously established menu of asset profiles codes. As such, the previous efforts of filling out forms, sending in the forms, and entering the information from the forms into a database are greatly streamlined or eliminated. This may be particularly useful where a government agency disposes of the same type of property on numerous occasions because once the agency subscribes with the provider company, it may simply maintain its subscription and thereby avoid repeating this step when it wishes to dispose of other assets having the same community and asset restrictions. As an additional alternative, sellers can set up and define their own community groups of authorized buyers. This permits sellers to restrict the sale of a particular asset to as large or small a community as they desire. Using these techniques makes it possible to accommodate any regulations or procedures that might be in place concerning the restricted sale or distribution of assets.

An additional feature preferably embodied in the present invention allows a seller to indicate multiple profile codes for a particular asset 145. These profile codes will restrict who is eligible to bid on a particular asset depending how long the asset has been on sale. In other words, when an asset is first offered, it may have a first asset profile code that restricts its transfer to one community of buyers with certain qualifications for a period of time. If the asset is not sold by the end of that time period, the present invention will automatically update or alter those community restrictions and asset restrictions to a second profile code 240 which has different, and likely less restrictive community restrictions and asset restrictions. Alternatively, as assets move from stage to stage through the disposition process, an asset's status can be updated manually 240 by authorized asset managers, thereby allowing another means to control the asset. In the embodiment shown in FIG. 2, there is shown a situation where two asset profile codes are established; however, the seller may indicate as many time periods and profile codes as it deems necessary.

For example an asset might have a first profile code that restricts the transfer of the asset for the first month to a particular governmental agency. After this first month, if the asset is not purchased by the particular government agency, the asset automatically moves to the next stage. The seller may designate that during the second stage the asset has a second profile code wherein the transfer of the asset is limited for the next two months to only non-profit organizations. If after this time period the asset is still not sold, the asset is again automatically moved to the next stage. The seller may designate that during this third stage, the asset is available to the general public. Preferably, the seller will designate the time periods and profile codes for the different stages when it first enters the asset information.

The government agency will also provide asset status information that is stored on the CAS 90. The software for maintaining the database of this information is preferably maintained on the CAS 90. Depending on the volume of assets for the selling agency or subscriber, a dedicated CAS 80 may be established or a shared CAS 90 will be made available.

In addition to the CAS 90, a preferred embodiment will also utilize an Enterprise Auction Server ("EAS") 100. The EAS 100 is the server upon which the provider's auction software and auction database and associated database maintenance software reside. The EAS database will also include information, which may be described as subscriber auction information. Such information may include the subscriber's internet address, auction contact personnel information, auction transaction information and security controls. In addition, the EAS 100 will include the provider company's buyer database, which includes buyer's information, such as buyer profile codes, shipping information, contact information and payment information.

An additional feature for the provider's auction software may be the ability to browse for and locate shipping firms which are available to pick up and deliver items. Also, if a subscriber will accept third party payment for items, searching and browsing capabilities for such information can also be provided. Buyers may also be able to set a bidding profile for an item which will enable automated bidding to occur up to a pre-set limit. In addition, buyers may be able to set the bidding profile for an item to include automated computer notification when he or she has made the winning bid, or has lost the bid, or both.

Figure 4:
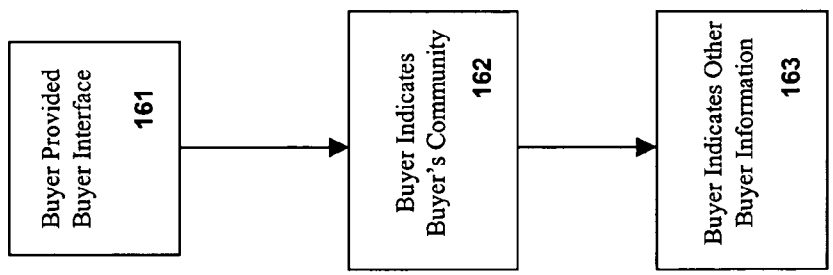
FIG. 4 represents a flowchart of a preferred embodiment of a buyer supplying buyer profile information.

Like with the government agency sellers, buyers must register or subscribe with the provider company. As shown in FIG. 4, interested buyers register by way of a buyer interface 161. The registration information provided by the buyer is stored on the EAS 100. Similar to the government agency sellers, buyers are queried to provide essential demographic information, including name, address, telephone number, and e-mail addresses. In addition, buyers are prompted to establish a profile code which will be used to match asset profile codes that were assigned by the government agencies. For example, when a buyer registers on the EAS, he or she may be asked to identify his or her organizational community 162. The buyer may also be asked a series of questions that will also serve to establish a buyer profile code 163, such as whether members of the community have particular qualifications such as licenses or permits. Once established, these buyer profile codes will control which buyers are allowed to see what assets in what time frames for bidding purposes. This is accomplished because the buyer profile codes will permit browsing, searching and bidding to only eligible buyers. Importantly, the profile codes will enable the EAS 100 to automatically match assets having particular asset profile codes with authorized potential buyers to inform buyers when particular types of assets are made available. In this way, information on government assets are automatically disseminated to the largest number of qualified buyers as possible. As such, government agencies are more likely to obtain the highest price that the market will bear for its property.

In an alternative embodiment, it will be possible for buyers to search the database of assets stored on the provider company's computer system for particular assets that they are authorized to bid on when they so desire. This is preferably accomplished by way of software that is resident on the EAS, which will enable browsing and searching by buyers of assets stored on the EAS. This software preferably will also enable the buyer "drilling down" capabilities. "Drilling down" will enable the buyer to obtain more descriptive details located on the EAS about the property. Buyers will also be able to "can" their browse and search criteria in order to facilitate repetitive queries for the particular types of assets on which they are interested in bidding. Search functions may include partial key searches, as well as the ability to select items based on Boolean search criteria, such as strike price or type of property.

As asset status information is loaded into the CAS 90, key indicative information will preferably be automatically replicated into the EAS 100 to facilitate rapid entry of and access to such information. The CAS 90 is capable of being loaded and maintained using intranet or Internet Web-based window, or by a batch upload utility. The CAS support system also provides for entering, editing and securing subscriber client asset information.

Figure 5:
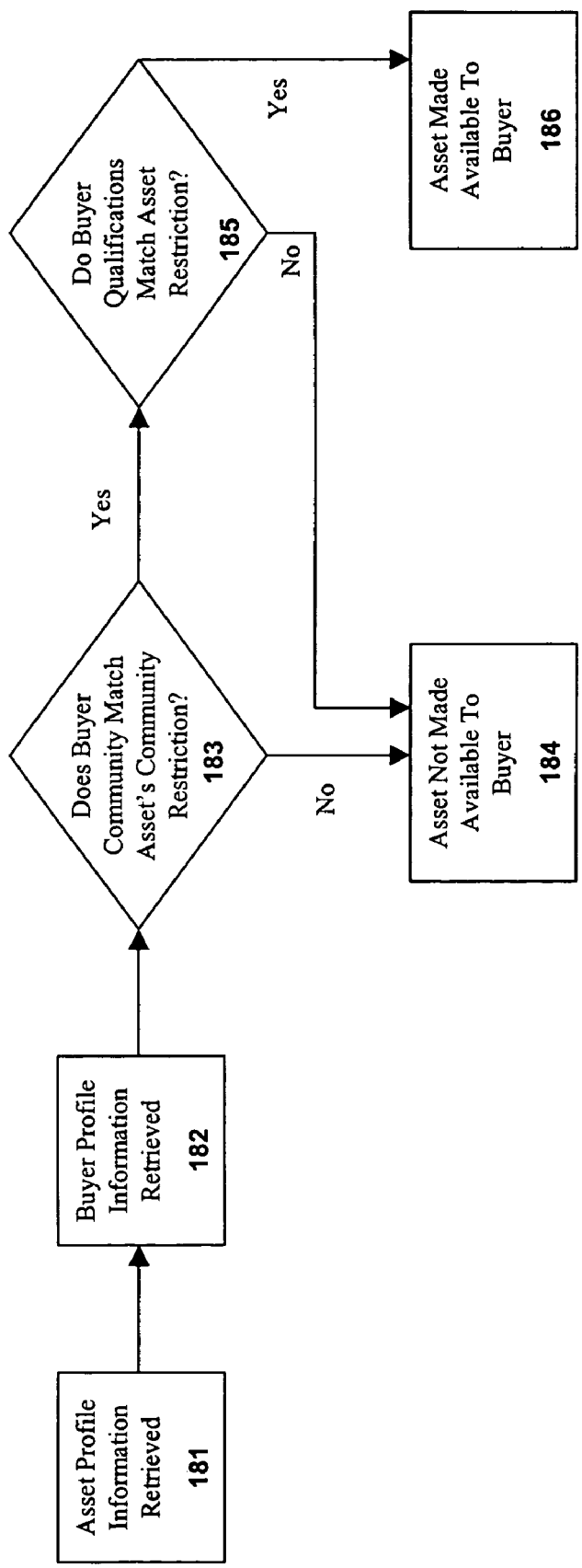
FIG. 5 represents a flowchart of a preferred embodiment of the matching process.

As stated previously, a key to the present invention is the process of matching buyers that are members of communities and that have particular qualifications with the asset profile code for a particular asset. In the particular embodiment shown in FIG. 5, it is assumed that the asset profile includes both a community restriction and an asset restriction. However, it is contemplated that an asset profile code may only include a community restriction. As shown in FIG. 5, asset profile information is retrieved from a memory 181, and the buyer profile information of at least one buyer is also retrieved from a memory 182. Although steps 181 and 182 are shown sequentially, they may be performed in any order or simultaneously. The buyer's community is then compared with the community restriction for the asset 183. If the buyer's community and the community restriction for the asset do not match, then the asset is not made available to that particular buyer 184. The buyer's qualifications are then compared with the asset restrictions for the asset 185. If the buyer's qualifications and the asset restriction for the asset match, then the asset is made available to that particular buyer 186. Again, while the comparisons 183 and 185 are shown in this particular sequence, the inquiries may be made in any order or simultaneously.

According to the method of the present invention, after the asset profile code has been checked against the buyer profile codes and the eligible buyers have been notified, the auction may proceed 200. In a preferred embodiment, the auction proceeds in a manner similar to other computerized Internet auctions. The auction takes place on a specific web site that is accessible by all authorized buyers. The buyers are enabled to observe and participate in the auction on the web site. As bids are received from buyers, the highest bid is updated. In addition, a clock may be shown to inform buyers of the time remaining on an auction.

Bidding for property, depending on the type of asset or property to be auctioned, may also include multiple stages. One example is by changing the community restriction and/or asset restriction over defined periods of time, as discussed above. Additionally, items may be set to be sold to the highest bidder who is willing to meet or surpass a "strike" price for the item. A strike price is a minimum price that a selling agency is willing to accept from another government agency or other buyer for particular excess property. The present invention provides the ability to identify which groups of buyers are authorized to buy at the strike price 150 while that price is in effect from all the buyers registered with the provider company. If no other buyer is willing to meet the strike price for an excess property item by a predetermined time or date, then, as discussed, the item can be reclassified and set for a subsequent auction that is open to buyers with a different profile code at a later time or date 240. Preferably, the ability to assign buyers to groups based on a profile code will enable this capability to be automatically performed, thereby greatly reducing the duration of time for disposing of the property and reducing the inventory and storage costs. Buyers may also be able to set a bidding profile for an item which will enable automated bidding to occur up to a pre-set limit. In addition, buyers be able to set a bidding profile for an item to include automated computer notification when he or she has made the winning bid, or has lost the bid, or both.

The subscriber's business related information is established on an Enterprise Business Server ("EBS") 110. The EBS 110 is the provider's server upon which may be kept the business related database containing client information, auction transaction information and receivables status, such as credit memo information. This secured information may include invoicing addresses (including e-mail), business contacts, and terms of payment. Payment terms may include the applicable percent of sale charged by the provider and any tax information. In addition, if the subscriber is utilizing third party financing, the applicable financing information could be included. The EBS 110 may also include the business servers maintenance and report producing software. While the CAS, EAS and EBS have thus far been described as being separate servers, it is contemplated that they may exist on any number of servers in any combination, as well as on a single server.

In a preferred embodiment, the winning buyer is given an award certificate 230. The buyer will be presented with the award certificate in any number of manners, including, e-mail, download, facsimile, mail etc. In a highly preferred embodiment, the award certificate is presented via the Internet, wherein an image of the award certificate can be downloaded and printed. The certificate may include the certificate number, the buyer's name and contact information, a description of the item and the item number, the location of the item, payment and delivery instruction, identification of any federal, state or local tax rules which may apply, and any restrictions and terms related to the sale such as restrictions as to who may buy certain types of items.

After the transaction is completed, a number of steps may occur. The status of the asset will be set on the EAS 110 to transaction completed. The agreed to price will be posted on the assets record in addition to the certificate number and the date by which the buyer or his or her agent must appear to the subscriber with the certificate and make payment for the asset. An invoice memo will be updated in the EBS. The invoice memo will identify the subscriber and the buyer, and include the date of the transaction, the auction certificate number, a short description of the asset, and the asset's identification number. The buyer identification will include the buyer's name and address, buyer identification number, and the buyer's profile code which is applicable to the transaction.

For assets not paid for and/or claimed by the winning bidder, the subscriber will be able to update the status of the auctioned asset to either ready for re-auction, or to have the asset removed from the auction list. This status will be updated in the CAS and replicated in the EAS. In addition a credit memo for the amount of the unsuccessfully auctioned asset will be updated in the EBS. The credit memo will identify the original invoice transaction to which the credit memo is being applied.

Periodically, based on the subscriber's payment terms, the EBS will automatically produce an invoice report and an invoice detail for uninvoiced transactions. Credit memos made since the last invoice will also be included in the report and the invoice detail. The invoice detail will identify the assets and the invoice transactions for which the credit memo are being applied. Once the invoices and credit memos have been issued, their statuses in the database will be set to "issued." Adjustments to the status of invoices and credit memos may also be made.

Reports and inquiries will be developed to support system balance assurances, audits, and management and operations analyses. The system assurance reports and inquiries will provide for reconciling the EAS, the CAS and the EBS to ensure they are in balance. The audit reports and inquiries will provide a history of all the auctions recorded in the database related to the subscriber, the assets, and financial transactions. The audit reports and inquiries will provide the information required to track the financial transactions in the system from start to finish. The management and operation reports and inquiries will provide transaction, database, subscriber, asset, buyer and financial summary information.

For security reasons, the method of the present invention is preferably utilized in conjunction with a firewall or other security measure to ensure confidentiality of sensitive information such as financial information. In a preferred embodiment, access to the system may only be achieved by persons or organizations that are provided access codes upon subscription with the provider.

The foregoing is illustrative of the principles of the present invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

What is claimed is:

1. A tiered method for automatically auctioning an asset over a computer network comprising a plurality of computers in communication with one another, the asset comprising government surplus or excess, the tiered method comprising the steps of:

(a) storing in computer memory buyer information for a plurality of potential buyers, the buyer information for each of the plurality of potential buyers including a buyer profile code;

(b) retrieving from computer memory asset information for the asset to be auctioned, the asset information including a first asset restriction;

(c) retrieving from computer memory the buyer profile codes from the plurality of potential buyers;

(d) comparing the first asset restriction with the buyer profile codes and determining a first group of authorized bidders from the potential buyers having a buyer profile code matching the first asset restriction;

(e) notifying only the first group of authorized bidders of the asset for auction;

(f) conducting a first tier auction, the first tier auction comprising:

(1) presenting the asset for auction only to the first group of authorized bidders;

(2) receiving bids from the first group of authorized bidders; and (3) concluding the first tier auction at least upon expiration of a first specified time period;

(g) automatically performing a second tier auction if an outcome of the first tier auction is that the asset remains available, performing the second tier auction comprising the additional steps of:

(1) assigning a second asset restriction to the asset, (2) retrieving from computer memory the buyer profile codes from the plurality of potential buyers;

(3) comparing the second asset restriction with the buyer profile codes and determining a second group of authorized bidders from the potential buyers having a buyer profile code matching the second asset restriction;

(4) presenting the asset for auction only to the second group of authorized bidders; and (5) receiving bids from the second group of authorized bidders and concluding the second tier auction at least upon expiration of a second specified time period.

2. The method of claim 1, wherein a seller-defined strike price is assigned to the asset before the first tier auction, and if a bid received during the first tier auction is greater than or equal to the strike price concluding the auction before expiration of the specified time period and awarding the asset to the buyer making the bid greater than or equal to the strike price.

3. The method of claim 1, wherein a seller-defined strike price is assigned to the asset before the second tier auction, and if a bid received during the second tier auction is greater than or equal to the strike price concluding the auction before expiration of the specified time period and awarding the asset to the buyer making the bid greater than or equal to the strike price.

4. A tiered method for automatically auctioning an asset over a computer network comprising a plurality of computers in communication with one another, the method comprising a plurality of auction tiers, (a) each of the auction tiers comprising the steps of:
      (1) retrieving from computer memory asset information for the asset to be auctioned, the asset information including an asset restriction;
      (2) retrieving from computer memory the buyer profile codes from a plurality of potential buyers;
      (3) comparing the asset restriction with the buyer profile codes and determining a group of authorized bidders from the potential buyers having a buyer profile code matching the asset restriction;
      (4) notifying only the group of authorized bidders of the asset for auction;
      (5) conducting a tiered auction, the tiered auction comprising presenting the asset for auction only to the group of authorized bidders, receiving bids from the group of authorized bidders; and concluding the tiered auction at least upon expiration of a specified time period;
   (b) automatically performing an additional tiered auction if an outcome of the first tier auction is that the asset remains available, performing the additional tiered auction comprising the steps of:
      (1) assigning a new asset restriction to the asset,
      (2) repeating step (a) with the new asset restriction, and
   (c) concluding the tiered method upon sale of the asset or if the asset is withdrawn from auction.

5. The method of claim 4, wherein if the asset is unsold upon expiration of the specified time period of a last of the plurality of tiers, automatically conducting a public auction by notifying the potential buyers of the asset for auction, presenting the asset for auction to the potential buyers, receiving bids from the potential buyers; and concluding the public auction at least upon expiration of a specified time period.

\* \* \* \* \*